INVENTOR:
ANTON A. F. LAGERWEY
BY: *H. D. Burich*
HIS ATTORNEY

United States Patent Office 2,912,003
Patented Nov. 10, 1959

2,912,003
VALVE

Anton A. F. Lagerwey, Amsterdam, Netherlands, assignor to Shell Development Company, New York, N.Y., a corporation of Delaware Application December 4, 1956, Serial No. 626,116

Claims priority, application Netherlands December 14, 1955

2 Claims. (Cl. 137—547)

The invention relates to a valve which is provided with means for blowing or flushing clean the sealing faces.

Valves through which are passed liquids or gases mixed with small solid particles have the disadvantage that owing to the solid particles which tend to deposit on the sealing faces of the valve body and the seat, the valve cannot be properly closed, or that the particles damage the sealing faces of the valve.

Constructions have already been proposed which are so designed that the valve faces can be blown or flushed clean by means of an auxiliary gas or liquid. These known constructions are, however, usually complicated and expensive. It has also been suggested to incorporate a filter so that the medium is filtered before passing the valve. The latter construction has admittedly the advantage that the cleaned medium flowing through the valve keeps the valve faces clean, but it is unusable if it is not intended to free continuously the medium flowing through from the solid particles present.

The object of the invention is to provide a valve suitable for use in a line through which a gas or liquid medium, mixed with powder or small solid particles, is transported, and in which the sealing faces of the valve or the seat are flushed or blown clean by the medium itself which flows through, without the solid particles being continuously removed from the medium.

According to the invention this object is attained by a filter being mechanically coupled to the valve body in such a way that only during the last phase of the closure of the valve is the filter entirely located in the passage of the medium, so that the medium is forced to flow first through the filter and then through the valve passage.

As a result of this construction the valve, when it is in the normal open state, allows the gas or liquid mixed with the solid particles of powder to pass through. During the last phase of the closure of the valve the filter is, however, brought into the liquid or gas stream, so that the liquid or gas stream is then forced first to pass the filter and then the valve passage. This ensures that, just before the valve comes to rest on the seat, filtered gas or liquid flows through the valve passage, so that any solid particles are removed from the sealing faces of the valve body and the seat just before the valve is closed. This ensures a good closure, while damage to the valve faces is prevented.

The filter could, for example, be movably connected to the valve body or valve rod, so that while the valve is being closed the filter first covers a medium supply opening, after which, as a result of the movable connection, the valve body itself can be further displaced in relation to the filter until the valve body rests on the seat.

An embodiment of a very simple construction is obtained according to the invention by a bell-shaped part being arranged around the valve body, the walls of which bell-shaped part are partly designed as a filter, and the vertical walls of which are provided with sealing faces or rims, which bell-shaped part is movably secured to the valve rod or valve body in such a way that, as the valve is closed, the sealing faces or rims of the bell-shaped part come to rest on the corresponding seat somewhat earlier than those of the valve body.

The bell-shaped part may, for instance, be rigidly designed and mounted on the valve rod so as to be axially slidable. A helical spring slid around the valve rod, and resting against a collar on the valve rod and against the top of the bell-shaped part, may in that case be used in order to ensure a resilient fastening in a simpler manner.

According to the invention a preferred embodiment is that in which the movable connection between valve rod or valve body and bell-shaped part is obtained by the top of the bell-shaped part being flexibly designed. An extra spring is thus unnecessary.

Further details relating to the invention will be illustrated with reference to the following description of the figures of the accompanying drawing.

Figure 1:
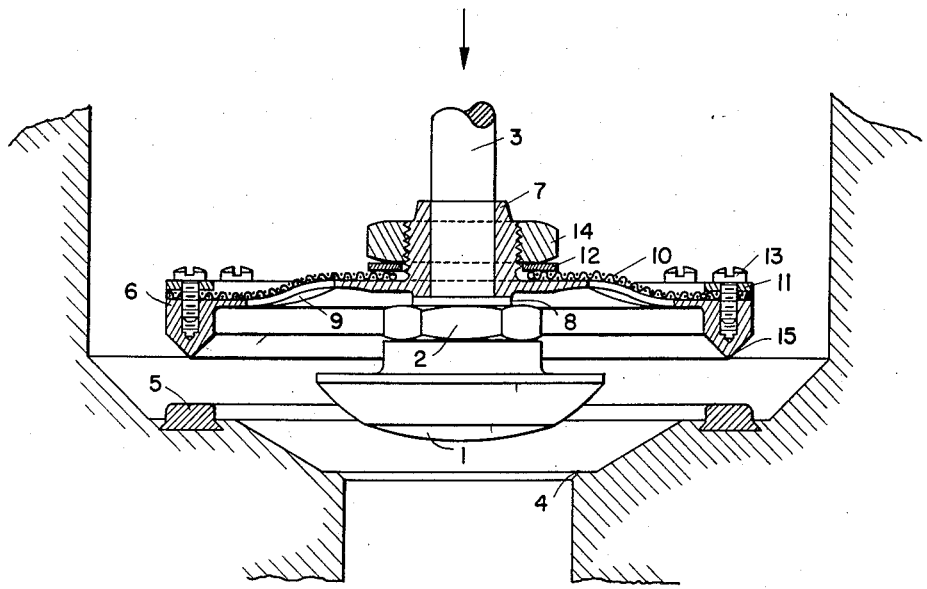
Figure 1 is an elevation view partially in section showing one embodiment of the valve of my invention in open position.
Figure 2:
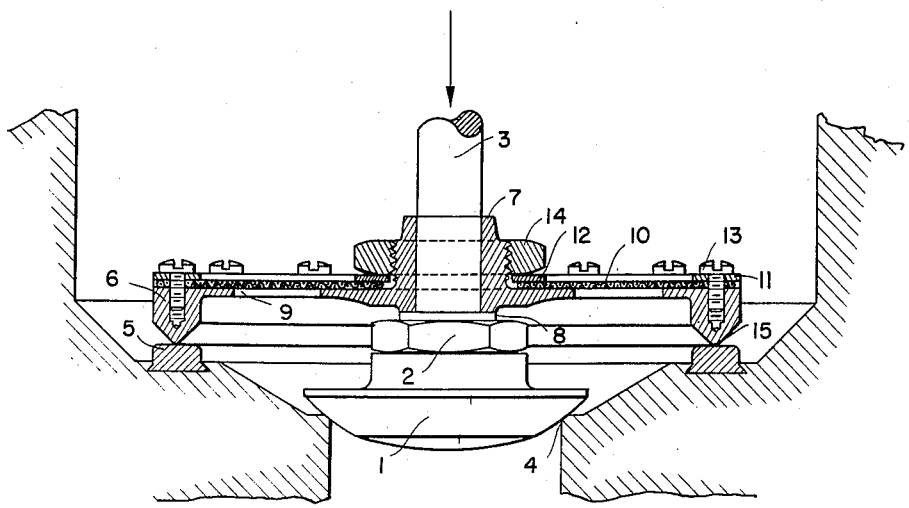
Figure 2 is an elevation view partially in section showing the valve of Figure 1 in closed position.

The valve body 1 is secured by means of the nut 2 to a valve rod 3 (only part of which is shown) capable of axial movement by well known means. The valve body 1 rests on the valve seat 4 when the valve is in the closed position. The auxiliary valve seat 5 is capable of cooperating with the sealing rims 15 of the bell-shaped part 6 which is provided with a cylindrical part 7 which is clamped on to the valve rod 3 and lies against the collar 8 on the valve rod 3. Holes 9 covered with wire screen 10 of suitable mesh are provided in the top of the bell-shaped part 6. This wire screen 10 which thus forms the filter element is secured to the bell-shaped part 6 by means of flat rings 11 and 12 which are pressed against the top of the bell-shaped part 6 by the screws 13 and the nut 14 respectively. The nut 14 is screwed on the cylindrical part 7 which is threaded on the circumference. The top of the bell-shaped part 6 is of a more or less flexible design.

The valve operates as follows: When the valve is in the opened position, as shown in Figure 1, the liquid or gas, mixed with the solid particles, flows freely through the valve in the direction of the arrow. As the valve is closed the valve rod 3 moves downward. As a result of the positioning of the bell-shaped part 6 in relation to the valve rod 3 and in relation to the valve body 1, the sealing rims 15 of the bell-shaped part 6 will come to rest on the seat 5 just before the sealing faces of the valve member 1 contact the seat 4. As soon as the sealing rims 15 of the bell-shaped part 6 rest on the seat 5, all liquid or gas flowing through is forced to flow through the filter element 10. Consequently from that moment only filtered liquid or filtered gas flows along the seat 4. As the top of the bell-shaped part 6 is of a flexible design the valve body 1 can be further displaced until the valve 1 also rests on its seat.

Since only filtered liquid or filtered gas passes the seat 4 during the last phase of the closure of the valve, the sealing rims or faces of the valve 1 and the seat 4 are flushed or blown clean just before the valve comes to rest on the seat, so that no solid particles can find their way between the sealing rims or faces, and a good sealing of the valve is ensured. Damage by hard particles is also prevented thereby.

The closed side of the bell-shaped part 6 is more or less flexible in the embodiment shown in the drawing. When the valve is opened the bell-shaped part will invariably assume a concave shape as a result of its resilience. The advantage of this is that any filter cake present is broken loose by the tensile effect. It is clear that a rigid bell-shaped part 6 can also be used. In this case the bell-shaped part 6 can be secured to the valve rod 3 in such a way that it is capable of axial movement over a small distance in relation to the valve rod 3. A helical spring around the valve rod can then serve to keep the bell-shaped part in the lowest position when the valve is opened. As the valve is closed, the sealing rim of the bell-shaped part comes to rest on the relevant seat and subsequently the bell-shaped part is displaced somewhat axially along the valve rod against the pressure of the spiral spring as the valve rod and valve body are further axially displaced. This insures that the valve can be closed even when a rigid auxiliary valve body is used after the sealing rings or faces of the bell-shaped part have contacted the relevant seat.

The valve according to the invention can be used in lines through which are transported gases or liquids in which solid particles are present, e.g. finely divided catalysts in liquids or gases. The valve according to the invention may also be advantageously used in lines for emptying boilers and for numerous other services where solid particles are present in a fluid stream.

I claim as my invention:

1. A valve device for fluid flows comprising a valve seat, a valve body having a valve rod, a flexible bell-shaped member providing a filter, said bell-shaped member being movably connected about said valve rod and so arranged that as the valve body approaches the valve seat the rim of the bell-shaped member contacts a rim on the valve seat prior to seating of the valve body on the valve seat.

2. A valve device for fluid flows containing solids in suspension comprising a valve seat, a valve body having a valve rod, a disc-shaped flexible member of larger diameter than said valve body having a dependent rim and movably connected about said valve rod, a filter element forming part of said disc-shaped flexible member, said disc-shaped flexible member being so arranged that as the valve body approaches the valve seat the dependent rim contacts a rim on the valve seat prior to the seating of the valve body on the valve seat.

References Cited in the file of this patent

UNITED STATES PATENTS

| 144,097 | Hille | Oct. 28, 1873 |
| 1,567,612 | Pascale | Dec. 29, 1925 |
| 2,213,998 | Sifkovitz | Sept. 10, 1940 |
| 2,595,012 | Smith | Apr. 29, 1952 |